United States Patent
Permeh et al.

(10) Patent No.: US 11,657,317 B2
(45) Date of Patent: May 23, 2023

(54) AUTOMATED SYSTEMS AND METHODS FOR GENERATIVE MULTIMODEL MULTICLASS CLASSIFICATION AND SIMILARITY ANALYSIS USING MACHINE LEARNING

(71) Applicant: Cylance Inc., Irvine, CA (US)

(72) Inventors: Ryan Permeh, Irvine, CA (US); Stuart McClure, Irvine, CA (US); Matthew Wolff, Laguna Niguel, CA (US); Gary Golomb, Santa Cruz, CA (US); Derek A. Soeder, Irvine, CA (US); Seagen Levites, Portland, OR (US); Michael O'Dea, Estero, FL (US); Gabriel Acevedo, Irvine, CA (US); Glenn Chisholm, Irvine, CA (US)

(73) Assignee: Cylance Inc., San Ramon, CA (US)

( * ) Notice: Subject to any disclaimer, the term of this patent is extended or adjusted under 35 U.S.C. 154(b) by 1207 days.

(21) Appl. No.: 15/789,765

(22) Filed: Oct. 20, 2017

(65) Prior Publication Data

US 2018/0060760 A1    Mar. 1, 2018

Related U.S. Application Data

(63) Continuation of application No. 14/313,863, filed on Jun. 24, 2014, now abandoned.

(Continued)

(51) Int. Cl.
*G06N 20/00* (2019.01)
*G06N 5/02* (2023.01)
*G06F 9/50* (2006.01)

(52) U.S. Cl.
CPC .......... *G06N 20/00* (2019.01); *G06F 9/5038* (2013.01); *G06N 5/02* (2013.01); *G06F 2209/5011* (2013.01)

(58) Field of Classification Search
CPC ........ G06N 20/00; G06N 5/02; G06F 9/5038; G06F 2209/5011; G06F 16/186; G06F 16/245
See application file for complete search history.

(56) References Cited

U.S. PATENT DOCUMENTS

| 5,841,947 A | 11/1998 | Nordin |
| 6,430,590 B1 | 8/2002 | Fischer |

(Continued)

FOREIGN PATENT DOCUMENTS

| AU | 2014302603 A1 | 1/2016 |
| AU | 2020201706 A1 | 1/2021 |

(Continued)

OTHER PUBLICATIONS

Text Classification based on Limited Bibliographic Metadata, by Denecke, published 2009. (Year: 2009).*

(Continued)

*Primary Examiner* — Thomas Fink
(74) *Attorney, Agent, or Firm* — Jones Day

(57) ABSTRACT

Under one aspect, a computer-implemented method includes receiving a query at a query interface about whether a computer file comprises malicious code. It is determined, using at least one machine learning sub model corresponding to a type of the computer file, whether the computer file comprises malicious code. Data characterizing the determination are provided to the query interface. Generating the sub model includes receiving computer files at a collection interface. Multiple sub populations of the computer files are generated based on respective types of the computer files, and random training and testing sets are generated from each of the sub populations. At least one sub model for each random training set is generated.

14 Claims, 7 Drawing Sheets

Related U.S. Application Data

(60) Provisional application No. 61/838,820, filed on Jun. 24, 2013.

(56) References Cited

U.S. PATENT DOCUMENTS

| | | | |
|---|---|---|---|
| 6,546,551 | B1 | 4/2003 | Sweeney et al. |
| 6,556,983 | B1 | 4/2003 | Altschuler et al. |
| 6,748,593 | B1 | 6/2004 | Brenner et al. |
| 7,181,768 | B1 | 2/2007 | Ghosh et al. |
| 7,240,048 | B2 | 7/2007 | Pontius |
| 7,624,449 | B1 | 11/2009 | Pierrot et al. |
| 7,937,705 | B1 | 5/2011 | Prael et al. |
| 7,945,902 | B1 | 5/2011 | Sahoo |
| 8,135,994 | B2 | 3/2012 | Keromvtis et al. |
| 8,321,941 | B2 | 11/2012 | Tuvell et al. |
| 8,347,272 | B2 | 1/2013 | SuQawara et al. |
| 8,370,613 | B1 | 2/2013 | Manadhata et al. |
| 8,402,543 | B1* | 3/2013 | Ranjan ............... H04L 63/1416 726/23 |
| 8,549,647 | B1 | 10/2013 | Mason et al. |
| 8,631,395 | B2 | 1/2014 | Sathyanathan et al. |
| 8,818,923 | B1 | 8/2014 | Hoffmann |
| 8,887,163 | B2 | 11/2014 | Rastogi |
| 8,930,916 | B1 | 1/2015 | Soeder et al. |
| 9,015,685 | B2 | 4/2015 | Greiner et al. |
| 9,104,525 | B2 | 8/2015 | Dang et al. |
| 9,176,842 | B2 | 11/2015 | Chen et al. |
| 9,262,296 | B1 | 2/2016 | Soeder et al. |
| 9,378,012 | B2 | 6/2016 | Soeder et al. |
| 2003/0097617 | A1 | 5/2003 | Goeller et al. |
| 2005/0049497 | A1 | 3/2005 | Krishnan et al. |
| 2005/0102246 | A1 | 5/2005 | Movellan et al. |
| 2005/0223238 | A1 | 10/2005 | Schmid et al. |
| 2006/0047807 | A1 | 3/2006 | Maonaohi et al. |
| 2006/0112388 | A1 | 5/2006 | Taniguchi et al. |
| 2006/0282476 | A1 | 12/2006 | Dolby et al. |
| 2008/0133571 | A1 | 6/2008 | O'Sullivan et al. |
| 2008/0184367 | A1 | 7/2008 | McMillan et al. |
| 2008/0184371 | A1 | 7/2008 | Moskovitch et al. |
| 2008/0304516 | A1* | 12/2008 | Feng ............... G06F 9/5038 370/468 |
| 2009/0132449 | A1 | 5/2009 | Nagashima |
| 2009/0133125 | A1 | 5/2009 | Choi et al. |
| 2010/0082400 | A1 | 4/2010 | Bagherjeiran et al. |
| 2010/0082513 | A1 | 4/2010 | Liu |
| 2010/0107170 | A1 | 4/2010 | Stehley |
| 2010/0107245 | A1 | 4/2010 | Jakubowski et al. |
| 2010/0318999 | A1 | 12/2010 | Zhao et al. |
| 2010/0325620 | A1 | 12/2010 | Rohde et al. |
| 2011/0004574 | A1 | 1/2011 | Jeong et al. |
| 2011/0040825 | A1 | 2/2011 | Ramzan et al. |
| 2011/0093426 | A1 | 4/2011 | Hoglund |
| 2011/0138369 | A1 | 6/2011 | Chandra et al. |
| 2012/0079490 | A1 | 3/2012 | Bond et al. |
| 2012/0221497 | A1 | 8/2012 | Goyal et al. |
| 2012/0323853 | A1 | 12/2012 | Fries et al. |
| 2013/0103380 | A1 | 4/2013 | Brandstatter et al. |
| 2013/0152200 | A1 | 6/2013 | Alme et al. |
| 2013/0205279 | A1 | 8/2013 | Osminer et al. |
| 2013/0227683 | A1 | 8/2013 | Bettini et al. |
| 2013/0263097 | A1 | 10/2013 | Dawson et al. |
| 2013/0291111 | A1 | 10/2013 | Zhou et al. |
| 2013/0347094 | A1* | 12/2013 | Bettini ............... G06F 21/577 726/11 |
| 2014/0068768 | A1 | 3/2014 | Lospinuso et al. |
| 2014/0090061 | A1 | 3/2014 | Avasarala et al. |
| 2014/0180738 | A1 | 6/2014 | Phillipps et al. |
| 2014/0250429 | A1 | 9/2014 | Greiner et al. |
| 2014/0358828 | A1 | 12/2014 | Phillipps et al. |
| 2014/0372513 | A1 | 12/2014 | Jones |
| 2015/0039543 | A1 | 2/2015 | Athmanathan et al. |
| 2015/0106310 | A1 | 4/2015 | Birdwell et al. |
| 2015/0248556 | A1 | 9/2015 | Sickendick et al. |
| 2016/0203318 | A1* | 7/2016 | Avasarala ............... G06F 21/56 726/23 |

FOREIGN PATENT DOCUMENTS

| | | |
|---|---|---|
| CA | 2915383 A1 | 12/2014 |
| EP | 1762957 A1 | 3/2007 |
| EP | 3014443 A1 | 5/2016 |
| EP | 3722954 A1 | 10/2020 |
| HK | 1224402 A1 | 11/2016 |
| JP | 2008-276774 A | 11/2008 |
| JP | 2010-511951 A | 4/2010 |
| JP | 2010-165230 A | 7/2010 |
| JP | 2016-525239 A | 8/2016 |
| JP | 2019-197549 A | 11/2019 |
| WO | 2008/017991 A2 | 2/2008 |
| WO | 2008/068450 A3 | 6/2008 |
| WO | 2012/075336 A1 | 6/2012 |
| WO | 2014/210050 A1 | 12/2014 |

OTHER PUBLICATIONS

Object Classification in Astronomical Images, by White, published 1996 (Year: 1996).*

Bai et al., Detecting Malicious Behavior Using Critical API-Calling Graph Matching, 2009, 4 pages.

Baysa, D. et al., "Structural entropy and metamorphic malware", Springer-Verlag France, *J Comput Virol Hack Tech* (2013), pp. 179-192.

Bird et al., "Annotation Tools Based on the Annotation Graph API," Jul. 2001, 4 pages.

Dahl et al., "Large-Scale Malware Classification Using Random Projections and Neural Networks," *2013 IEEE International Conference on Acoustics, Speech and Signal Processing (JCASSP)*, May 26-31, 2013, Vancouver, BC. pp. 3422-3426.

De Campos, et al., "Bayesian Networks Classifiers for Gene-Expression Data," *Intelligent Systems Design and Applications (ISDA)*,11[th] International Conference on IEEE, Nov. 22, 2011, pp. 1200-1206 (2011).

Eagle, "Chapter 1: Introduction to Disassembly," *The JOA Pro Book: The Unofficial Guide to the World's Most Popular Disassembler*, San Francisco, No Starch Press, 2nd Edition, pp. 3-14 (2011).

Inoue, "Anomaly Detection in Dynamic Execution Environments," Abstract of Dissertation. Jan. 31, 2005, 190 pages. Retrieved from the Internet: URL:https://www.cs.unm.edu/~forrest/dissertations/inouedissertation.pdf [retrieved on May 26, 2015].

Koutnik, Jan et al."A Clockwork RNN." *Proceedings of the 31st International Conference on Machine Learning*. vol. 32, Feb. 14, 2014, pp. 1863-1871.

Lczelion, "Tutorial 1: Overview of PE File format," *Programming Horizon*, Jun. 1, 2013. Wayback Machine. Web. Feb. 23, 2015.

Nguyen et al., "A Graph-based Approach to API Usage Adaptation." *OOPSLA/SPLASH '10*, Oct. 17-21, 2010, Reno/Tahoe, Nevada, pp. 302-321.

Nguyen et al., A graph-based approach to API usage adaptation, Oct. 2010, 20 pages.

Pascanu et al. "Malware classification with recurrent networks." *2015 IEEE International Conference on Acoustics, Speech and Signal Processing (ICASSP)*, Apr. 19, 2015, pp. 1916-1920.

Rieck et al., "Automatic analysis of malware behavior using machine learning," *Journal of Computer Security*, 19:639-668 (2011).

Samak et al., "Online Fault and Anomaly Detection for Large-Scale Scientific Workflows," High Performance Computing and Commun/ Cations (Hpcc), 13th International Conference on IEEE, Sep. 2, 2011, pp. 373-381 (2011).

Shin et al, "Data Hiding in Windows Executable Files." *Proceedings of the 6th Australian Digital Forensics Conference*, Edith Cowan University, Perth, Western Australia, Dec. 3, 2008, Research Online.

Stolfo et al., "Anomaly Detection in Computer Security and an Application to File System Accesses," *Lecture Notes in Computer Science*, M.S Hacid et al. eds., Springer, Berlin, Heidelberg, vol. 3488: 14-28 (2005).

Wang et al., "Detecting Worms via Mining Dynamic Program Execution," *Third International Conference on Security and Pri-*

(56) References Cited

OTHER PUBLICATIONS

*vacy in Communications Networks and the Workshops*, Sep. 17, 2007, Securecomm 2007, Piscataway, NJ, pp. 412-421.

Wikipedia, FIFO (computing and electronics) webpage, downloaded Jul. 2016.

Wikipedia, page for Data Type, retrieved Jul. 2015, URL: https://en.wikipedia.org/wiki/Data_type.

Wikipedia, page for File System, retrieved Jul. 2015, URL: https://en.wikipedia.org/wiki/File_system.

Wikipedia, Queue (abstract data type) webpage, downloaded Jul. 2016.

Wikipedia, Scheduling (computing) webpage, downloaded Jul. 2016.

Xu et al., "Polymorphic Malicious Executable Scanner by API Sequence Analysis," Proceedings of the Fourth International Conference on Hybrid Intelligent Systems. (HIS 2004), Kitakyushu, Japan, Dec. 5-8, 2004, Piscataway, NJ, pp. 378-383.

Shabtai et al., "Detection of malicious code by applying machine learning classifiers on static features: A state-of-the-art survey," Information Security Technical Report 14:16-29 (2009).

Office Action issued for Canadian Patent Appln. No. 2915383, dated Jun. 5, 2020 (4 pages).

Office Action issued for Australian Patent Appln. No. 2020201706, dated Dec. 1, 2020 (5 pages).

Office Action issued for Australian Patent Appln. No. 2014302603 dated Aug. 29, 2019 (6 pages).

Office Action issued for Japanese Patent Appln. No. 2016-521905, dated May 29, 2018 (11 pages).

Office Action issued for Japanese Patent Appln. No. 2016-521905, dated Feb. 5, 2019 (8 pages).

Extended European Search Report issued for European Patent Appln. No. 20170435.0, dated Sep. 15, 2020.

Elman et al., "Finding Structure in Time," Cognitive Science, (1990) 14:179-211.

Pascanu, Razvan, "On Recurrent and Deep Neural Networks." Thesis: University of Montreal, 1:2:6 (2015).

Non-Final Office Action for U.S. Appl. No. 14/313,863, dated Oct. 10, 2014 (17 pages).

Final Office Action for U.S. Appl. No. 14/313,863, dated May 22, 2017 (37 pages).

Final Office Action for U.S. Appl. No. 14/313,863, dated Feb. 8, 2016 (37 pages).

Final Office Action for U.S. Appl. No. 14/313,863, dated Jan. 29, 2015 (33 pages).

Non-Final Office Action for U.S. Appl. No. 14/313,863, dated Aug. 18, 2016 (40 pages).

Non-Final Office Action for U.S. Appl. No. 14/313,863, dated Jul. 23, 2015 (33 pages).

English Translation of Office Action issued for Japanese Patent Application No. JP 2019-102364, dated Mar. 30, 2021 (13 pages).

English Translation of Office Action issued for Japanese Patent Application No. JP 2018-501314, dated Mar. 30, 2021 (5 pages).

International Search Report and Written Opinion for International Application No. PCT/US2014/043934, dated Oct. 14, 2014 (10 pages).

Communication Pursuant to Article 94(3) Office Action issued on EP Application No. 20170435.0, dated Feb. 17, 2022.

* cited by examiner

AUTOMATED SYSTEMS AND METHODS FOR GENERATIVE MULTIMODEL MULTICLASS CLASSIFICATION AND SIMILARITY ANALYSIS USING MACHINE LEARNING

CROSS-REFERENCE TO RELATED APPLICATIONS

The current application is a continuation under 35 U.S.C. § 120 of U.S. patent application Ser. No. 14/313,863, filed Jun. 24, 2014 and entitled "Automated System for Generative Multimodel Multiclass Classification and Similarity Analysis Using Machine Learning," which claims priority to U.S. Provisional Patent Application No. 61/838,820, filed Jun. 24, 2013 and entitled "Automated System for Generative Multimodal Multiclass Classification and Similarity Analysis using Machine Learning," the entire contents of each of which are incorporated by reference herein.

TECHNICAL FIELD

The subject matter described herein relates to systems, methods, and computer program products for automated and generative multimodel multiclass classification and similarity analysis using machine learning.

BACKGROUND

The space of determining if a sample falls into a category and how closely it compares and in which degrees to other samples is a costly and human intensive problem. Traditional methods require humans to make multiple decisions in the process, which adversely affects scalability and repeatability of the process. Additionally, humans are ill equipped to consider data at the scale required to solve difficult problems. Finally, these systems tend to be either overly general and wildly inefficient or overly specific and focused on specific problems.

SUMMARY

This current subject matter is directed to a process in which computers can be used to efficiently create classifications and similarity analysis using probabilistic models generated through the principles of machine learning. The process does this in an automated way via use of generative models in which samples further train the system and result in iteratively better models that correctly represent the best predictive capabilities expressed within a particular sample population.

The process can be defined by five major functionality components and the infrastructure required in order to support these functions.
 Query Interface
 Sample collection
 Feature extraction from samples
 Multiclass Sample Classification and Similarity Analysis
 Model Generation A sample is any piece of data that you wish to classify or perform similarity analysis against similar samples. A feature is any salient data point that the system measures from a sample. A model is a single or multimodel probability matrix that defines the likelihood of any sample to be classified in a particular class. A multiclass classifier is one that can support classification in two or more classes. A multimodel classifier is one that uses sub models to handle particular intricacies in a complex sample. A generative classifier is one in which samples used to classify may become training material for future analysis.

In one aspect, a sample of data is placed within a directed graph (e.g., a directed acyclic graph). The directed graph comprises a plurality of hierarchical nodes that form a queue of work items for a particular worker class that is used to process the sample of data. Work items are scheduled within the queue for each of a plurality of workers by traversing the nodes of the directed graph. Thereafter, the work items are served to the workers according to the queue. Results are then received from the workers for the work items. In this arrangement, the nodes of the directed graph are traversed based on the received results.

The results can include extracted features from the sample of data. The samples of data and/or extracted features in some cases can be classified. In addition, at least one model (e.g., machine learning model, etc.) can be generated using the extracted features and/or the classification. In other cases, the sample of data can be used to simply classify the results. Data characterizing the classification can be provided in various fashions such as displaying the data, loading the data into memory, storing the data, and transmitting the data to a remote computing system.

The results can include routing data that is used to determine where to schedule a next subsequent work item in the queue.

An order of each sample can be prioritized prior to adding such samples to the queue so that each sample is added to the queue according to the prioritized order. The priorities can be based on a pre-defined rate of processing. Prioritization of the at least one sample can be locally adjusted in real-time. The work items can be scheduled in the queue according to at least one of sample prioritization or worker rate.

The workers to which the work items are served can be part of a pool having a dynamically changing size based on available resources. The available resources can be based on determined supply and demand.

In one variation, the sample of data includes files for access or execution by a computing system, and wherein the classification indicates whether or not at least one file likely comprises malicious code. In another variation, the sample of data includes medical imaging data and wherein the classification indicated whether or not at least one portion of the medical imaging data indicates a likelihood of an abnormal condition (e.g., cancerous cells, etc.).

Computer program products are also described that comprise non-transitory computer readable media storing instructions, which when executed one or more data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, the current subject matter provides for the automatic generation of models thereby obviating the need for human generated models and the errors associated therewith. Furthermore, the current subject matter provides enhanced techniques for classifying data/files for various applications.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
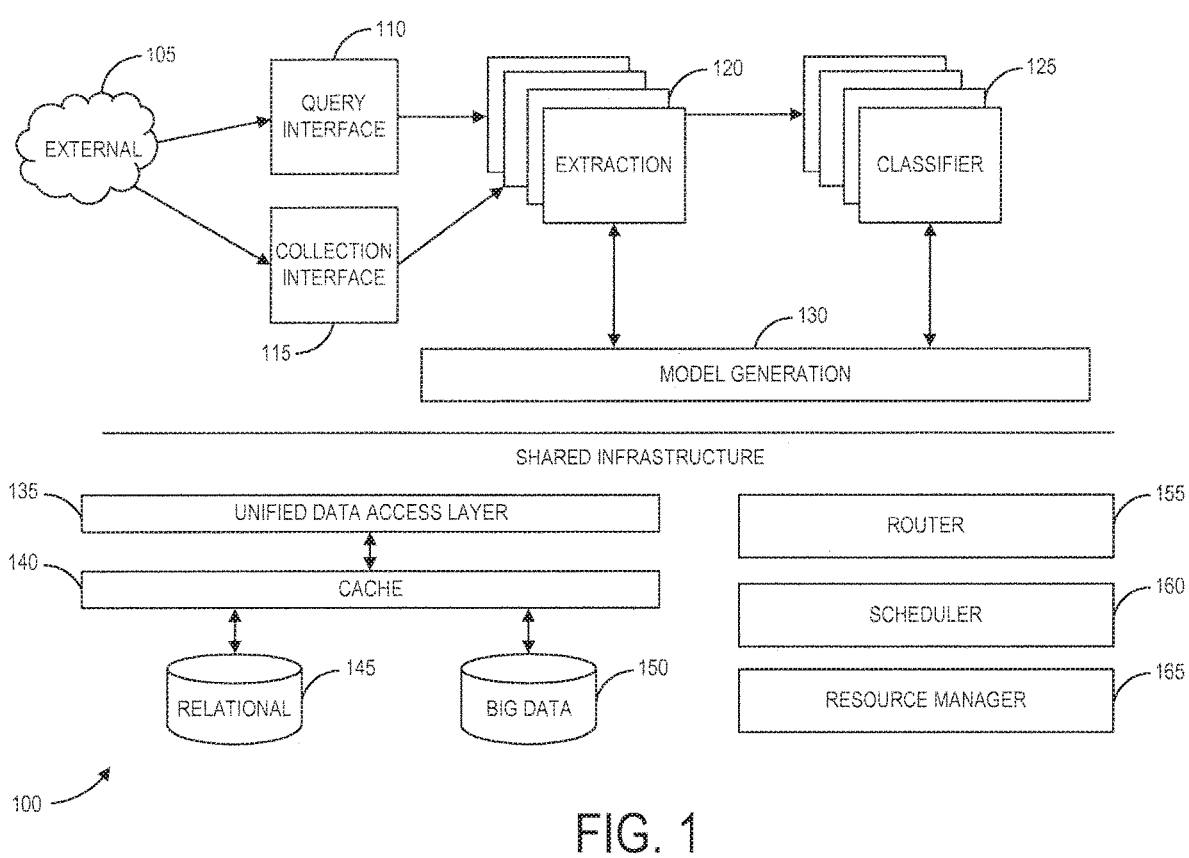
FIG. 1 is a system diagram illustrating major components of a system for implementing the current subject matter.

With regard to diagram 100 of FIG. 1, the system described herein can make use of key underlying infrastructure to provide its services, namely to extract features from a sample of data, make classifications regarding some or all of such extracted features, and generate machine learning models using such data that can be used to characterize subsequently data samples.

The infrastructure can include a unified data access layer 135 that access a cache 140 that stores data from data sources such as relational data stores 145 and big data sources 150. As will be described in further detail below, the infrastructure can include a router 155, a scheduler 160, and a resource manager 165. Unless otherwise specified in this detailed description and/or in the claims, the components of the infrastructure can be implemented in software, hardware, or a combination of both. The infrastructure is shared among the functions and acts as glue that binds the functions together. It has a key focus on optimization of the overarching process. It facilitates data flowing through the system, determines which resources are required, and appropriately schedules an optimal pathing and resource profile for the data.

The processes described herein can use a dynamically configurable workflow system to define ordering of sample data through an optimal path. An external source 105 (e.g., via a web service and/or other network, etc.) can query data from a query interface 110 and/or submit data to a collection interface 115. Various features from data obtained from an interface can be extracted by an extraction component 120. In some variations, the extracted data can be classified (or otherwise characterized) by a classifier component 125. In addition, a model generation component 130 can generate or otherwise use one or more models (e.g., machine learning models, etc.) based on the extracted and/or classified data.

With the current subject matter, individual workers within the workflow system do not require specific knowledge of other workers, and do not assume a particular path through the workflow. They can however specify dependencies that will be honored by the scheduler 160 and router 155.

The workflow can use a centralized but scalable routing and prioritization system. Individual workers register with the central resource manager 165 and receive work via a pull mechanism. In addition, the workflow system can support a high degree of concurrency and flexibility. Work items can be heavy or light weight and will be scheduled to appropriate workers.

The workflow system can use a system to allow workers of each particular type to be added and removed without restarting the system. It also allows new ordering to be implemented and new types of workers to be added and existing workers to be removed.

The optimal workflow can be represented as a directed graph such as a directed acyclic graph (DAG), in which nodes are represented as the individual classes of workers. While the current subject matter uses DAGs as an example, other types of hierarchical arrangements/directed graphs can be utilized. The graph is defined by worker class prerequisites in a backward chain dependency mapping process that attempts to generate the shortest path through the graph. This process results in a forward chaining of worker classes that represent the optimal pathing through the workflow.

Initially, individual worker classes can define prerequisites via a configuration file. This configuration contains a seed of a routing system, allowing an optimized route to be built up at runtime. Thereafter, individual worker classes can be built into a DAG which can then be published to, for example, a central resource manager 165. The central resource manager 165 can then use this new DAG to determine optimal routes for traversing a particular sample of data (which results in selective scheduling of work items to workers/classes of workers).

The central resource manager 165 using the router 155 can define where work items go next. This frees individual workers from having to know or care how messages are passed. The central resource manager 165 relies on the configured graph paired with the output of each worker to define the optimal next step in the workflow process.

A sample of data can be placed in a state in the DAG, represented as a queue of work items for a particular worker class. Next, a worker can be served the work item by the router 155. The worker can then return the work item and, in some cases, data useful for routing such as additional layers of information to assist in routing. For instance, if a worker determines that the object has shown signs of corruption, flagging this can help route the object to a better solution. The central manger can now determine the optimal next route based on the results of the current work item and the results of the current worker. The central resource manager 165 then shifts the sample to the next state as defined by the DAG.

The central resource manager 165 using the scheduler 160 can be responsible for scheduling work for individual workers. The central resource manager 165 can do this by managing the ordering of work items in the queue. For each work item class, represented as a queue of work items, individual items can be provided to workers based on a variety of factors including sample prioritization and worker rate. Additionally, the scheduler 160 is responsible for handling work items in exceptional cases, such as those being handled by workers who have gone offline or are operating out of parameters.

In some variations, a sample can enter a particular DAG state. The scheduler 160 can them determine the order of the sample in the queue. The scheduler 160 can watch for work items that have been in a checked out state for too long and reinsert them in the waiting state at the appropriate place.

Work items can be prioritized by the scheduler 160 based on a rate of processing. Prioritization offers both global and local optimization potential. Local prioritization optimization focuses on operations within a node in the system, where global optimizations involve prioritization operations that affect multiple hosts and route paths. A higher priority sample gets precedence over lower priority samples. Prioritization of a sample can be locally adjusted in real-time to accommodate exceptional scenarios. Higher priority can be reserved for sample processing that require a shorter time to complete analysis. Lower priority can be reserved for bulk processing from passive sources such as backfill operations or samples read from feeds.

For global prioritization optimization, individual samples can be assigned a prioritization based on the mechanism of insertion into the workflow. The scheduler 160 can use this global prioritization throughout the workflow, giving higher priority work items shorter queue wait times, and lower priority work items longer wait times.

For local prioritization optimization, the scheduler 160 can determine that the current prioritization for a work item is incorrect or causing a block in the queue. In such cases, the scheduler 160 can dynamically adjust the prioritization for the work item higher or lower depending on the scenario.

The infrastructure can provide a dynamic scaling factor based on a number of criteria. The primary global metric for scaling can be total processing time for a work item. To adjust a global metric in a heavily distributed system with high variance in sample diversity, a number of local metrics can be considered and adapted to. These local metrics can include, for example: average sample processing time per activity, individual activity work factor, per host load metrics, and available RAM, CPU, and disk. Additionally, the overall system can ensure continuous operation of the whole system in the event of small or large localized failures. In this sense, the scheduler 160 can provide a failsafe self-healing mechanism. The dynamic scaling can be achieved via a combination of detailed monitoring and rapid adaptation of the available resource pool (i.e., the pool of workers, etc.), as well as optionally scaling the complete pool of resources. This process can be managed by the central resource manager 165.

The resource management system as implemented by the resource manager 165 can utilize the concept of resource pools. A resource pool is a representation of all computer resources available within a particular class. Classes can generally be defined on commonalities such as operating system, or services offered. Each pool can be divided into resources given to individual workers.

Resource pools via the resource manager 165 can grow or shrink based on need and resource availability and cost. When resources are readily available and low cost, the resource manager 165 can grow the overall pool and service higher volumes. When resources become scare or costly, the resource manager 165 can shrink the overall pool and adjust the overall rate to suit requirements.

The resource management system as implemented by the resource manager 165 can utilize a variety of externally measured and self-reported feedback metrics that help determine resource pool utilization rates, and perceived demand.

The following are two types of feedback metrics that can be reported to the resource manager 165. First, measured metrics are those collected by a metric and statistics collection system. They tend to focus on the hard asset metrics such as CPU utilization, available memory or disk space. These are useful to help the resource manager 165 determine resource pool usage metrics, and define under- or over-utilized resources in the pool and adjust the load appropriately. Second, self-reported metrics are useful for determining deeper level of details. The workers and the resource manager 165 report data on processing rates and task times that allow us to determine highly granular resource usage. They are also useful for determining intended demand for resources.

Individual workers can report a variety of metrics to the resource manager 165 regarding their resource usage and internal timings and counts. These values assist in determination of the source of resource contention. Because metrics are generally collected on both sides of a transaction, the resource manager 165 can determine what is the root cause and what is the symptom, allowing the system to focus our resource optimization on the root cause and alleviate the symptom that way.

A particularly important set of self-reported metrics comes from the scheduler 160. The scheduler 160 can track individual worker rates of sample processing and calculate aggregate averages for rates (measured supply). The resource manager 165 also knows the size and wait times for each DAG state work queue (measured demand). These metrics are particularly useful for calculating anticipated total processing time, and determining if there are backups in the workflow. The scheduler 160 can report these metrics to the resource manager 165.

When an event, such as a work complete event or a resource limit event, occurs, a corresponding metric is sent by the node generating the event to the resource management system. The resource manager 165 can then create time series based aggregate and individualized measurements based on the self-reported data. These time series data points can be graphed and measured against known baselines. When time series data goes beyond certain points an action can be triggered, such as deploying additional resources into the resource pool.

In addition, the resource manager 165 can utilize various systems to monitor external states of resources including resource utilization rates as well as availability of resources. These measurements can help determine the optimality of usage. External monitoring can be conducted on a peer basis and also by using dedicated monitoring systems. These systems can continuously poll their intended monitoring targets (such as a resource that cannot self-report its state) and report the results to the resource manager 165.

On a timer or an untimed loop, a resource monitor can reach out to a target system. The resource monitor can then report the results of the monitoring action to the resource manager 165.

By monitoring the intended supply and demand of resources, the resource manager 165 can determine an optimal deployment of resources. It can ask individual workers to reconfigure themselves to suit the intended demand.

The resource manager 165 can operates on a timed resource leveling cycle. Once per timed period (say 5 minutes), the amount of used resources is compared to the amount of available resources. Any differences in trends of used and available resources should trigger appropriate remediation such as adding or removing resources from the pool. As reconfiguration of resources does incur overhead, it is imperative that the effect of reconfiguration be managed by the resource manager 165 to ensure the overall system is gaining a net benefit. This cycle can be designed to avoid undue constriction and dilation of resources leading to "flapping", where resources are continuously being reallocated for whichever task is currently the highest demand.

The resource manager 165 can also adjust the size of the pool based on not only existing supply and demand, but also external factors like availability and cost.

The resource manager 165 can use a rules-based approach to appropriately weight each metric in its calculations. The rules can be dynamically configurable but measured and refined based on the existence of available metrics and their value to the overall calculation.

One process for resource pool reallocation is as follows. Initially, the resource manager 165 can isolate a set of appropriate metrics collected during the cycle period under observation. The set can be defined based on a rules based approach. The resource manager 165 can then determine supply and/or demand from its set of metrics. The resource manager 165 can then examine the current resource pool allocation in light of the existing supply and demand. Next, the resource manager 165 can calculate a new resource pool allocation based on its calculations of supply and demand. In addition, the resource manager 165 can reconfigure workers by asking existing workers to perform more necessary tasks, by adding new workers, or by removing workers altogether, to match the new resource pool allocation. The new allocation pool can then be saved for use by the resource manager 165/scheduler 160/router 155 for a next period.

For resource pool scaling, the resource manager 165 can determine if the current resource pool allocation is too tight or too slack based on a threshold value (e.g., if 80% of workers are busy, >90% of the time, add more workers; or if <10% of workers are busy <50% of the time, remove workers from the pool, etc.). It is too tight if demand is outpacing supply. It is too slack if supply is outpacing demand. If the resource pool is too slack, the resource manager 165 can determine an optimal value to reduce the resource pool. The resource manager 165 can reallocate a new resource allocation for the reduced pool and engage the workers to reconfigure based on this new allocation. If the pool is too tight, the resource manager 165 can examine external cost and availability of additional of resources. Next, the resource manager 165 can choose to increase resource pool size, or decrease incoming volume by rate limiting. Rate limiting happens when a global processing time metric is being met. Resource pool increases happen when they are not. Further, the resource manager 165 can reallocate a new resource allocation for the increased pool and engage to reconfigure based on this new allocation.

The resource manager 165 can also serve the purpose of ensuring operation in adverse conditions. The system can be designed to presume that individual workers are temporal and may appear and disappear both under the control of the resource manager 165 and due to external factors. To ensure continuous operation, the resource manager 165 can utilize its monitoring system to address problems that arise in the operations. Like resource scaling and optimization, problems can be defined by a specific set of rules applied to metrics. In this case, the metrics are typically external in nature, as an internally reported metric may not be available if the system that reports that metric has a fatal situation.

The resource manager 165 can decommission continually underperforming assets in the resource pool and replace them with better performing assets. It can also raise alerts for manual intervention in the event that automated responses are not effective in alleviating the problems.

Self-healing can be implemented by having the resource manager 165 examine the current resource pool for underperforming and non-responsive assets. Thereafter, the resource manager 165 can create a new allocation using existing pool resources or scale the pool larger to replace those resources that are failing. The resource manager 165 can ask the new resources to configure themselves to replace the old resources. The resource manager 165 can later decommission old resources.

The current system utilizes several types of data stores which can be accessed by the unified data access layer 135. Various elements of the overall system have different requirements for data consistency, persistence, performance, and integrity. The system can utilize elements of large document based stores (e.g., big data 150), relational stores 145, and persistent and temporal caches 140. To achieve scale and resilience, all of these systems can utilize redundancy and horizontal sharding of data. Additionally, the unified data access layer 135 can have various needs for security levels of the data, as not every element needs complete and unrestricted access to all of the data.

The infrastructure can also provide a system to unify access to the resources. It can allow each of the systems to provision its particular needs, and it matches these needs with an appropriate backend store. It offers the system the ability to manage access and monitor usage for optimal access. Additionally it can offer an abstraction layer that reduces the requirements needed to implement a worker process.

The workers and various elements of the system access the unified data access layer 135 through a specified API. The unified data access layer 135 can use a template driven system to allow for rapid mapping of API calls to underlying data sources. The API can be primarily REST based and it can support SSL and multiple forms of authentication.

Most data access API operations can be managed by a component referred to as a data access manager. The data access manager can support addition and removal of API interfaces, handle management of back-end data resources, and manage security access to these interfaces via the supported mechanisms.

In order to create a data API, a particular need for a data access API can be defined. Parameters can be defined for consistency, performance, and persistence. Requirements regarding security and confidentiality can also be defined. The API manager can then provision appropriate back end resources to make them available. Thereafter, the API manager can link the back end resources with a front end REST call, with an optional translation operation.

In order to access an existing data API, the component in question does a service lookup request for the data access API service. Once located, the component can query the API and determine which services it offers. The service definition can include details on parameterization of access as well as security mechanisms required to access those services and serves as a guide for a component to access an API. When the component knows where a service is located, and how to access it, it can make calls to the data access API as it wishes. In the event of a failover, a redundant peer can serve requests.

The unified data access layer 135 can support multiple back end solutions. This arrangement helps developers to avoid worrying about access to multiple data sources, using multiple confusing drivers that may or may not be available on the platform. The back-end systems are defined by a set of conditions available to them such as resilience, performance, persistence, consistency, and cost.

For each backend system, it must be clear at which level it can reliably provide each of the above considerations. Data access can state the desired level needed. Specific levels of acceptable conditions can be stated in the API requirements. This defines which back end systems can effectively serve these requests. In the event that no back end systems can achieve the desired goal, an application can either operate at a degraded level (lower its expectations), or a new back-end data source can be deployed that may meet the criteria in question.

Resilience can be defined as the ability to continue operations under stress. Any backend component should be able to lose various parts of its operational capacity and be able to adapt effectively to adjust load across the remaining parts. There may be some degree of data loss as a negotiated requirement.

Performance can be defined by the speed at which data can be delivered or written. Some particularly complex data access operations can be long running and immediate response is not a requirement. Others require specific response times to ensure the viability of the application.

Persistence can be defined as the amount of time and size of the required data that must be kept in a recoverable state. The period could be from minutes to forever, and the data size requirements are necessary to help properly plan and scale the back-end data stores.

Consistency can be defined as the assurance that all nodes in a service grouping give the exact same result. This can be affected by certain clustering and replication actions as well as network distance between the clustered nodes. A system with no consistency does not bother with ensuring all nodes are the same. One with high consistency attempts to ensure that all nodes have the same data in near real-time. A common practice is one of "eventual consistency", in which the system will reach a defined equilibrium of consistency but makes no guarantee on the defined period.

The query interface 110 is a general component of the overall system that allows external entities to ask questions in regard to samples that have already been processed. The query interface 110 serves as the primary point of contact between external systems 105 and the accumulated knowledge of the system. It is intended to answer questions in a highly efficient manner. The query interface 110 only answers questions for which it has existing answers. Those questions for which the query interface 110 does not have existing answers are passed to the collection interface 115 for further analysis.

The query interface 110 can utilize a REST API. This allows it to utilize session encryption via SSL and offer a variety of authentication options.

The query interface 110 can be designed to answer questions based on specific acceptable metadata regarding the sample. This allows questions to be asked without requiring a transfer of the full sample. This can be helpful when the sample is large, complex, or not directly available.

The query interface 110 can be a specialized layer on top of the unified data access layer 135. The query interface 110 can interpret external requests via the API into queries against the unified data access layer 135. For those elements that it cannot answer via this access, the query interface 110 can provide details for the client to access the collection interface 115 to provide a path to get additional information.

Figure 2:
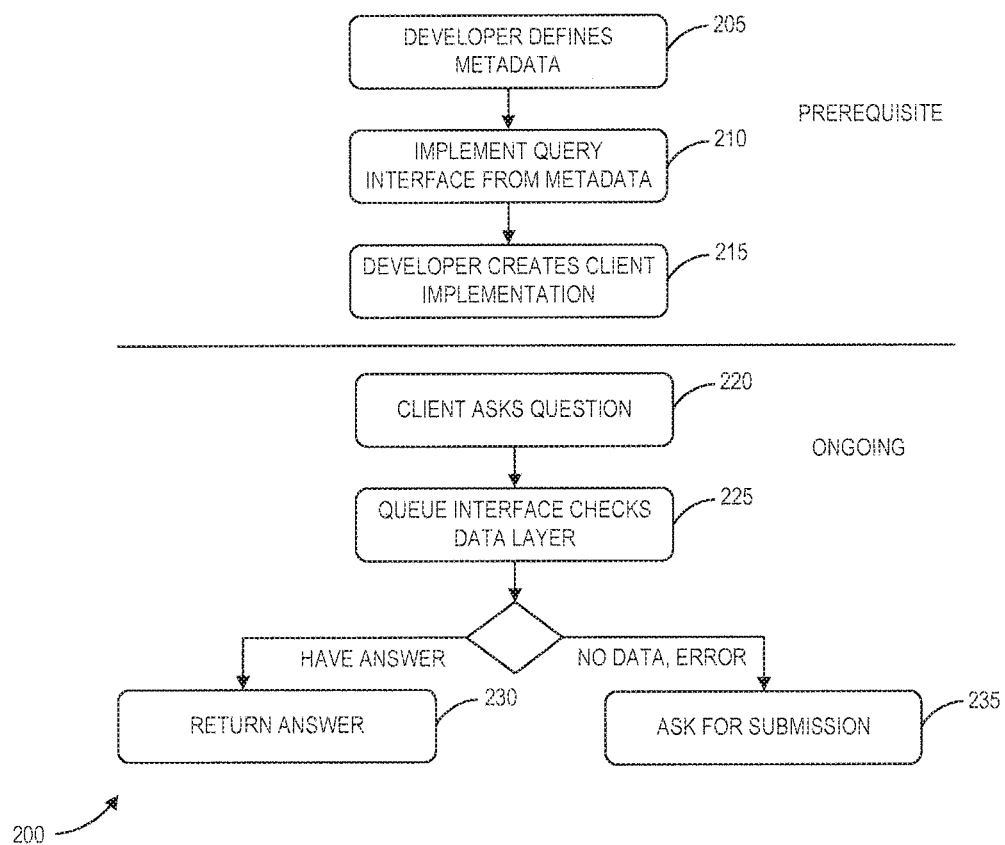
FIG. 2 is a diagram illustrating a process of using a query interface.

FIG. 2 shows a process flow diagram 200 related to the query interface 110. Initially, at 205, an external developer can determine they require the ability to query a specific sample set. The developer can then define the specific metadata required for access. Thereafter, at 210, the query interface 110 can implement an appropriate set of unified data access layer views into its data stores. The query interface 110 documentation can inform the developer of the specifics of the query interface API endpoint for the sample set they require. It also provides appropriate details in regard to required authentication and encryption. Subsequently, at 215, the developer can implement the appropriate query interface API within their client.

As the developer's program requires access to specific information about a sample, the client, at 220, can send the appropriate metadata comprising a question. Thereafter, at 225, the query interface 110 can check the unified data access layer 135 and, at 230, responds with the answers, or if answers are unavailable, at 235 respond with appropriate details on how to access the collection interface 115 (i.e., ask for a submission, etc.).

The collection framework components including the collection interface 115 can allow a defined path to get samples of data into the system for analysis and growing our knowledge. These samples serve as bits of information that offer immediate value based on the highest configured model as a classification. They also offer similarity analysis capability, allowing a submitted sample to be put into context among existing samples.

The collection interface 115 complements the query interface 110 as a primary external conduit for input into the system. The collection interface 115 can allow systems to be interfaced to provide samples for input and receive responses as output. The collection interface 115 can do this via a series of REST API interfaces. These API interfaces can be either public or private, and support SSL and authentication of various sorts.

Samples can be gathered in one of two general ways. Samples may be "pulled into the system" using an active collection mechanism defined within the system. Alternatively, they may be "pushed" to the system via any collection interface API compatible solution. The combination of active and passive collection allows the system to harvest samples and integrate into existing products in a very light touch way.

The collection interface 115 can make use of mechanisms to reduce the incidence of unintentional reprocessing. The collection interface 115 can do this by offering basic and complex caching of existing results, and a submission mechanism that can be adjusted to accept or reject submissions based on rules such as current existence and perceived fitness of the sample.

The collection interface 115 can integrate into the resource manager 165 provided by the general infrastructure. From this integration, the collection interface 115 can adjust rates of input to meet goals, and can offer a prioritization of sample submissions giving precedence on a variety of factors such as preconfigured API priority or dynamic rate adjustment in active collection. This offers a fundamental method to allow for dynamic optimization of submission rates utilizing whole system feedback. It can also help alleviate pressure on existing resource pools in lieu of growing or shrinking existing resource pools. When a sample is collected either passively or actively, the collection interface 115 can push the sample into the appropriate workflow system for processing.

Active collection offers a process in which the collection framework can manage actively gathering samples for submission. It can offer the ability to manage and schedule collection via the collection interface 115. It adds the benefit of using feedback from the existing resource manager 165 to dynamically adjust rate if desired.

An active collector is a subsystem that does some action on a specific period. The active collection framework can manage the rules that define what an active collector may do. Additionally, it can define a mechanism that works with the existing infrastructure scheduling system to support periodic execution of the collectors. This period can be defined as once per timeframe (ex: every 30 minutes), once per clock/calendar time (ex: 1 PM every Monday), or in a continuous manner. The scheduler 160 can ensure appropriate tasks are issued to workers on the correct period.

The rules that define what a collector can do can be complex and flexible to support a variety of use cases. Collectors can allow internal code to be run on the period, external programs to be run, or even make API calls on the period.

Active collectors generally do not interface with the query interface 110; rather they can access the unified data access layer 135 directly. Because these requests do not originate external to the system, they generally have less need for knowing about the current state of a sample and the associated knowledge the system has of that sample.

Figure 3:
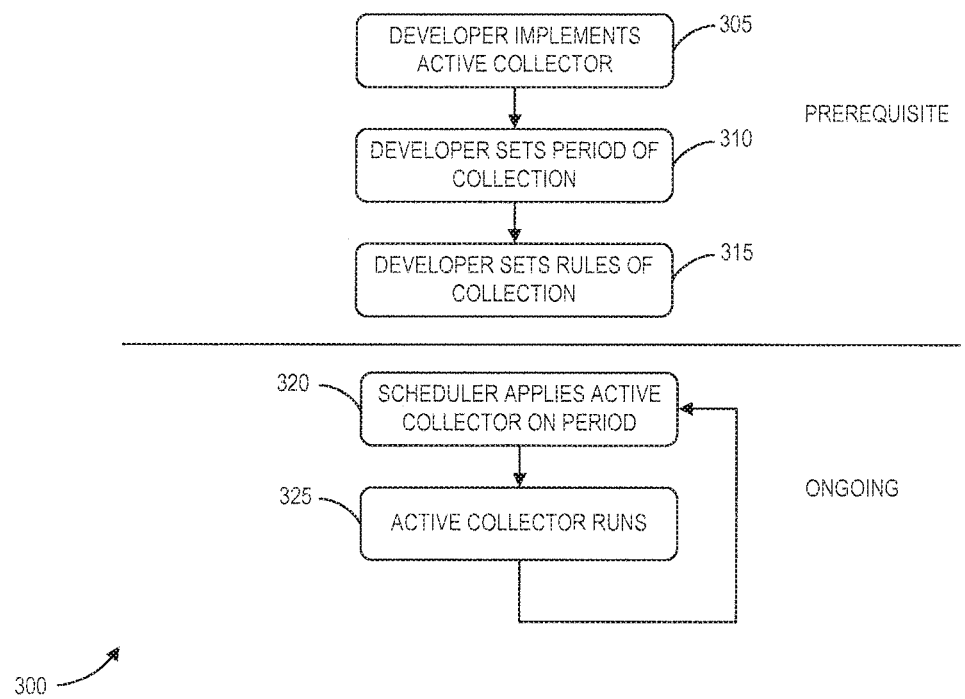
FIG. 3 is a diagram illustrating a process for active collection.

FIG. 3 is a diagram 300 illustrating a process for an active collector. Initially, at 305, a developer can define and build an active collection method. The collection framework can require rules to be written that define the period of active collection (either once per time range, once per set repeated fixed time, or continuous) which the developer, at 310, can provide. In addition, at 315, the developer can set rules of collection such as how the active collection is gathered. Once complete, at 320, the collection framework can manage the scheduler 160 to introduce the task (i.e., apply the active collector) at the appropriate period. Next, at 325, the scheduler performs the required logic for the active collector on the appropriate period.

One type of active collection can utilize a web crawling infrastructure. This web crawling infrastructure can allow a general or specialized web crawl to attempt to find suitable samples on the web for analysis. The general web crawler can process HTML pages in a standard manner. It parses the HTML and attempts to locate links and resources that would make appropriate samples, and pushes those samples into the system.

A specialized web crawl can be one whose scope is limited, and uses specific techniques to make the scan more appropriate. For instance, a specialized web scan can be performed against a specific site, tailored to that site. It can incorporate site-specific details such as previously gathered information to make the query more effective.

Another type of active collection can involve running arbitrarily complex queries either in the infrastructure's unified data access layer 135 or in any available external data store. Like all active collection mechanisms, this happens on a specific period.

When the period defines execution, the active data store collector can reach out to the appropriate data store and collect data to be processed. The active data store can do this individually or via a bulk query.

Passive collection is a subsystem of the collections interface 115 that can facilitate allowing external access to submitting new samples in an on-demand manner. Generally, it can be used in conjunction to the query interface 110.

Passive collection can provide a specific API that allows samples to be submitted. This API can be generally useful for when existing knowledge of a sample is missing, incomplete, or otherwise unavailable. Such an API can be a REST API that, in turn, enables SSL for session encryption, and offers a variety of authentication mechanisms to ensure desired levels of authentication and access control.

The passive collection interface API can generally operate in a three-stage manner. First, the passive collection interface API can confirm that the system is ready to accept a submission of a sample. If the system desires the sample, it provides details on where to put the sample. Finally, it expects a confirmation that the sample is put in the proper place.

The above system allows for a configurable method of upload. The original response from the passive collection interface API defines where the sample should be uploaded, along with any constraints or caveats. This can be a simple HTTP upload, a reference to an FTP or other publicly available URI, or an entirely other system as defined by the sample type and specifics of this instance of the passive collection interface API. This allows the process of uploading to be properly offloaded, and abstracted to best suit multiple types of samples.

In order to develop a passive collector, developers can consider the elements they wish to receive from an existing product or system. The developer can implement the collection submission client API within their existing product or system. This implementation requires configuration on which submission API endpoint to use, and any credentials if required. During normal product operations, submissions may be generated. Each submission can be sent to the collection submission API. The collection submission API can determine classification and similarity analysis based on current knowledge of the sample and return those results. If additional details are required for analysis, the submission API can offer additional functions to request these details. Failure to provide these details on behalf of the developer may result in lower confidence scores for classification and similarity analysis.

Figure 4:
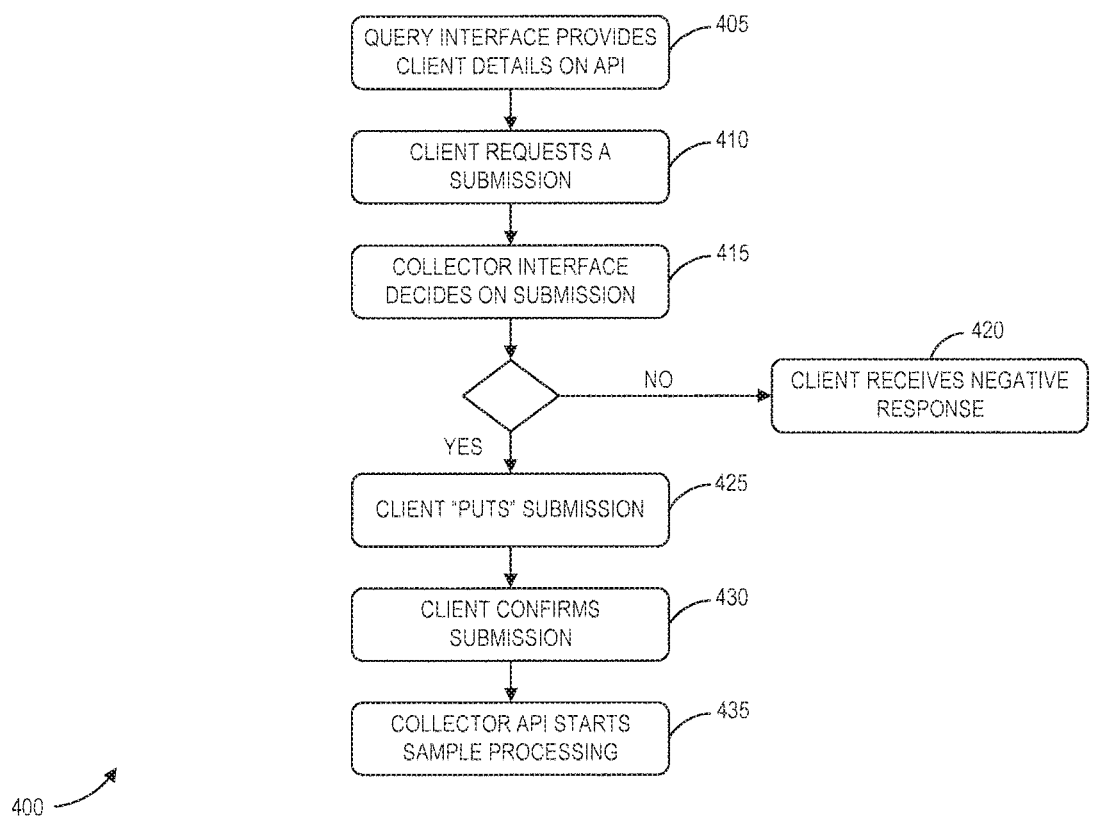
FIG. 4 is a diagram illustrating a process for a passive collector interface API.

FIG. 4 is a diagram 400 for accessing the passive collection API. The query interface first provides, at 405, details on the passive collection API to the client. Thereafter, at 410, an external client entity asks to submit a sample (i.e., requests a submission to the passive collection interface API. This can be paired internally with the query interface API. Next, at 415, the passive collection interface system can determine if it desires a submission of the sample based on specifically designated criteria (previous existence, age of existing knowledge, etc.). If the passive collection interface system desires the sample, it responds to the external client entity with an affirmative response and details on where to "put" the sample, otherwise, at 420, the client receives a negative response. Depending on the sample type, this may be one of a variety of options. The external client entity can perform, at 425, the necessary actions to "put" the sample in the correct place. The external client entity can then submit, at 430, a confirmation to the passive collection interface API. Upon a successful confirmation, the passive collection interface system can, at 435, place the sample in the proper workflow for further processing.

The extraction component 120 can serve the purpose of converting samples into salient data points, or "features" used for classification and similarity analysis. The extraction component 120 can do this by using a highly scalable, parallel processing distributed system to extract this information. The extraction component can be defined by a series of worker classes handled through the infrastructure dynamic workflow system. These worker classes can be developed on a per-sample type basis and allow the system to grow in a scalable manner. These worker classes can be effectively chained together by the DAG router 155 in the workflow system to ensure that additional extraction workers can be added and removed at runtime in a dynamic manner.

Each worker class can represent some set of extracted features and can be associated with a specific sample type. The system can use dynamic typing of samples to ensure that the correct operations are performed on a per sample basis. It achieves this via the use of the infrastructure router 155 and scheduler 160. The router 155 can ensure that samples are processed in an appropriate manner. The scheduler 160 can ensure that the samples are processed in a timely manner.

The resource manager 165 can ensure that there are adequate resources available to perform each class of work in an on-demand and planned basis. Each worker class represents a resource that needs to be managed by the resource manager 165.

The worker class registers with the router 155 and other infrastructure systems to help the system understand the capabilities it has on hand. When a worker class registers, it provides a set of features it can provide to the router 155, as well as a set of routes and associated prerequisites and conditionals for each route. Each route can either be a default route (one taken if no other route has been selected), or a named route. Each named route has a series of conditions that must be met to be selected. If these conditions are met (based on the features accumulated for a sample), this named route is selected. There can be multiple named routes that have differing conditions, allowing for a complex routing scenario. The precedence of routing is inherent in the ordering of the routes upon creation.

The extraction component 120 can use a dynamic set of routing conditions that are dynamically defined in process. As a sample navigates the workflow as assigned by the router 155, the extraction component 120 can add additional information to the sample profile, allowing for more specialized worker class operations to be performed that produce deeper details.

Figure 5:
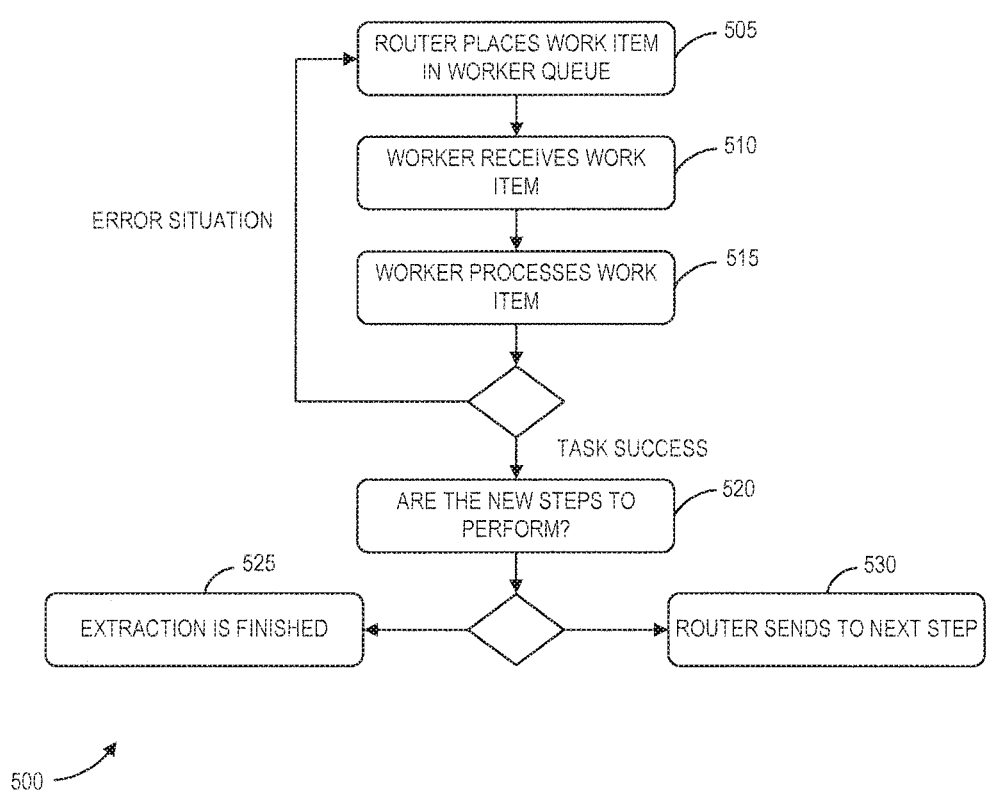
FIG. 5 is a diagram illustrating a process of extracting features.

FIG. 5 is a diagram 500 illustrating extraction of features. Initially, at 505, the router 155 can place a work item in a worker queue. Each work item can comprise one or more tasks to effect extraction. Subsequently, at 510, the worker receives a work item from the worker queue and, at 515, processes it. If the task was successfully processed, it is determined, at 520, whether there are steps/tasks to perform. If the task was not successfully processed, the work item (or a portion thereof) can be placed back in the worker queue and the process repeats. If it is determined that there are no new steps (at 520), then, at 525, extraction is finished, otherwise the router 155 sends the work item to the next step. A task is a bit of work performed on a sample, a step is a route to the next task to be performed. In graph theory, a task would be considered a node (or vertex), while a route would be an edge.

This process can occur with a dynamic typing system that adjusts based on previous knowledge collected in process. The existence of this knowledge is one of the factors used to create the reverse chain Directed Acyclic Graph used by the router. This ensures that the information required to make a decision at any point in the workflow is available when needed.

This arrangement generally defines a set of prerequisites and conditional factors on a per work class basis. The prerequisites define those data points that need to exist before the routing decision can be made by the router 155, and the conditionals are those features that are salient to the routing decision. Additionally, conditionals and can be performed on non-feature based data, such as an external API call.

A dynamic type-based route can be specified by a developer first defining those conditions that are required to perform the appropriate decision. Thereafter, the developer can determine which features can provide the data needed to meet the conditionals and mark these as prerequisites. The developer later can define the features this work class will provide. The router logic system can then calculate a Directed Acyclic Graph based on the required prerequisites, conditionals, and provided data points. The router logic system can build optimal models for the workflow based on this data.

Worker classes can form emergent "chains" of operations based on the Directed Acyclic Graph built and maintained by the router 155. The chain can define the operations required to optimally extract all available features from a particular sample. While the workflow is defined in process, some chains consistently match certain types of samples.

A chain can be locally optimized to reduce the number and types of transitions. The resource manager 165 can do this by allocating partial and whole chains to a single compute resource, allowing operations to happen in an effective manner with minimal transfer time. This arrangement can reduce the overhead involved in forcing data to be moved around in a parallel-distributed system, greatly enhancing the throughput the system provides. This arrangement can also allow for the creation of specific enclaves of processing, which is useful if a particular sample type has an anomalous usage structure (i.e. it uses a significant amount or resources or takes a long time to process).

Chains can be continually measured and optimized. This arrangement can allow for both automatic and manual adjustments based on ongoing feedback from the system. Knowledge of how chains perform offers the resource manager 165 better knowledge to optimize and anticipate resource utilization based on probability of anticipated chain usage. The resource manager 165 can also utilize real-time chain metrics to define if specific chains are over- or under-performing and adjust its global resource usage allocation appropriately. Chains that are infrequently used can be reduced and have resources assigned to those chains that are in heavy use.

New chains can be continually added to both consider new sample types as well as add additional depth to existing sample types. With this, the overall system gains new sources of information available to refine and consider new models for classification and similarity analysis of samples.

The classifier component 125 can provide a method to classify features extracted from a sample against existing models. The classifier component 125 can also provide similarity analysis across defined similarity points. The classifier component 125 can operate as independent worker classes focused on creating classifications. Like the extraction component 120, the classifier component 125 can create emergent chains within a Directed Acyclic Graph that the router 155 can use to push samples through via routing decisions. In addition, like extractors, these chains can be specific to sample types, allowing for a large amount of specialization in classification. Some of this specialization will be in regard to specific feature sets associated with individual samples.

The classification chain can comprise a set of workers that operate similarly to the extraction workers, or analysis workers. Their purpose can be to specifically create classifications and perform additional classification logic based on internal data like features and external data like data from exterior classification systems. Generally, the internal classifications can be based in part or whole on the output of specialized classifiers embodying the machine learning algorithms. Even those that do not utilize machine learning directly benefit from it, as it is used to measure optimal aggregation algorithms to best represent the current state of knowledge of the model.

The classifier component 125 can utilize the router 155 and scheduler 160 and abide by all of the inherent aspects of prioritization and optimization of routes. Additionally, the classifier component 125 can operate within the resource manager 165, allowing rates to be adjusted in real-time by allocating more resources to the classifier worker classes.

Like classification, similarity analysis can be performed using analytics models trained against a representative sampling of the population of all samples. Similar chains can handle large scale directed and undirected similarity analysis. Generally, directed similarity analysis can offer a higher degree of useful output. Undirected similarity analysis tend to be used more to explore sameness against the population, and to attempt to identify those samples that are fundamentally different from anything previously seen. Each similarity analysis can be time and model dependent. Having a new model or a different set of samples in the population may cause the similarity analysis to be recalculated.

Similarity analysis can further allow the detection of suitably anomalous "outliers". These outliers can be useful to determine that the models in question are still actively in range. If the rate of outlier detection goes up, the models being used can be re-evaluated to incorporate the newest types of samples within the population.

Classification can be conducted by the router 155 deciding that a sample is ready for classification when all requisite elements have been collected or loaded from a previous data store. Thereafter, the router 155 can shift the sample into the head of an appropriate classifier chain. The chain can then be executed and a final classification score can be calculated. The classifier chain can interface with the unified data access layer 135 so that the results of the classification can be stored. The classification of the sample is now available for future queries and usage in other places.

Similarity analysis can be conducted by the router 155 deciding that a sample is ready for similarity analysis when all requisite elements have been collected or loaded from a previous data store. The router 155 then shifts the sample into the head of an appropriate similarity analysis chain. The chain can then be executed and sets of similarity analysis scores can be calculated. Undirected similarity analysis can be stored in an area reviewable by humans to infer meaning. The similarity analysis chain can interface with the unified data access layer 135 so that the results of the directed similarity analyses can be stored. The similarity of the sample can then be available for future queries and usage in other places.

The classifier work items can support the use of aggregate classifications. These types of classifications can be layers built on top of previously calculated classifications. In a first pass classification, a sample can receive several individualized classification scores. A second stage can allow additional logic to be defined to best calculate effective aggregate classification scores to suit a particular need.

The use of a multi-stage classifier can allow complete and partial reclassification at high velocity and volume with minimal resource utilization. By leveraging the scheduler and router, missing elements in the multi-stage classifier can be backfilled if they are missing, incomplete, or not up to date. These calculations can be performed during processing, offering the use of the latest and most complete picture on each classification decision.

The system can use models to answer classification and similarity analysis questions about samples. Such models that drive the classifiers can be defined, developed and built. For these models to be effective, the cost of model generation needs to be minimized and optimized for cost and accuracy. A model can comprise a probability matrix based on machine learning techniques. To do this, a training set of samples can be extracted from a sample population and used to generate a model (i.e., a model can be trained using historical data in order to characterize future data sets/samples, etc.). The model can then be back-tested against a large validation set (that does not contain the sample set). Once a model is judged valid, it can be put into production use for the classifiers.

A subset of the total population can, in most cases, be used because the samples have a reasonably standard distribution. Because of this, using a large enough total population, and a large enough subset of that for training picked at random, results in a fair representation of the samples in total. Due to ongoing submissions of samples into the system, the number of sample sets and training sets can continuously increase. This arrangement allows iterative models to be built that have enough density to allow sub models to be built to perform better analysis in specialized classifiers.

While it is helpful to consider all samples as functionally equivalent, the reality is that there are logical gradients when moving from very general similarities to very specific similarities. The system can examine and attempt to create useful sub models to further refine these segregations. The models themselves can result in a multi-stage classifier that can allow a base level of very general features to be compared, and can result in more specific features to be compared against generally similar types of samples.

The model generation system can be designed to be hands off, allowing the use of internal measures to attempt to create optimal models. This involves defining success and failure criteria and finding the way to measure and compare the fitness of models to a particular task.

Figure 6:
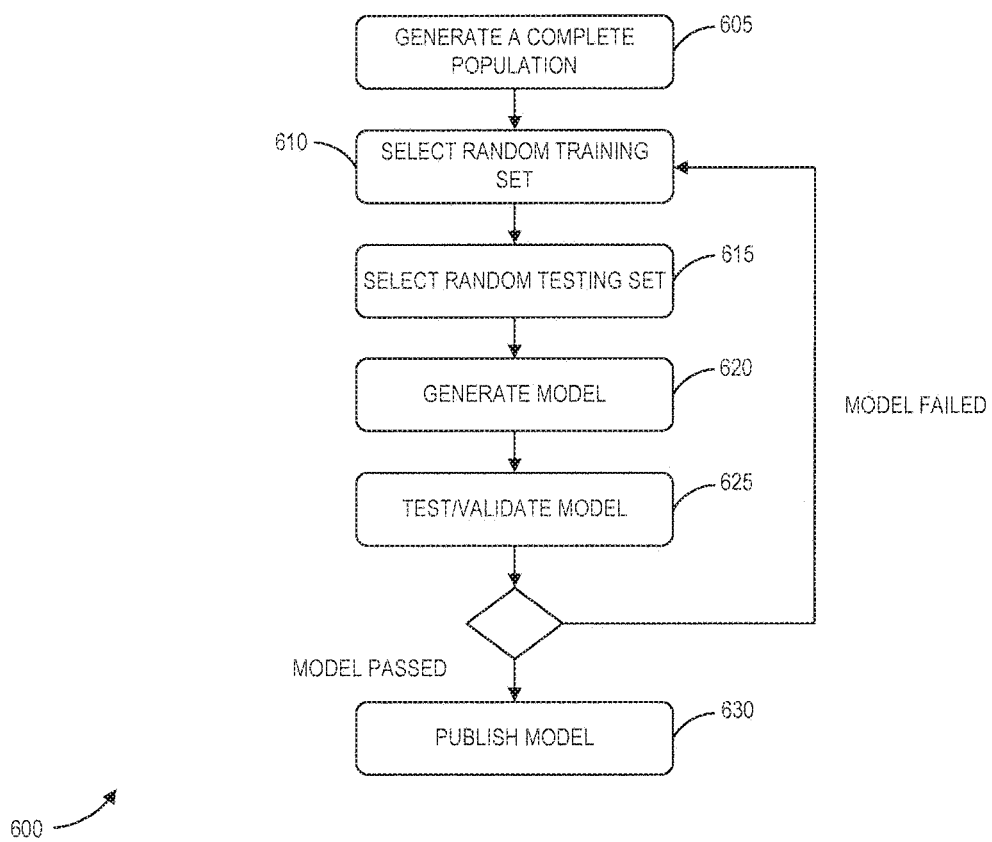
FIG. 6 is a diagram illustrating a process of model generation.

FIG. 6 is a diagram 600 that illustrates a process for general model generation. Initially, at 605, a complete census of the sample population can be taken (which can be referred to as the "whole population"). Thereafter, at 610, a random subset can be selected to act as a training set. In addition, at 615, a second random subset of the population can be selected from the remaining whole to serve as a testing set. Next, at 620, a model can be generated by applying machine learning classification techniques to the training set. The training set is processed into large vectors of numbers, and these vectors are used in a variety of machine learning algorithms including logistical regression, neural networks, support vector machines, and decision tree ensembles with custom tuned variables to generate a series of models. The models are further tested and refined to produce end stage models for use in the general system. Thereafter, at 625, the generated model can be tested against the testing set and, optionally, confidence intervals can be calculated. The confidence intervals can be compared against existing models to judge fitness and make a determination whether the model failed which causes 610-625 to be repeated or whether to publish the model (at 630).

The training set generator can be configured to attempt to reduce any specific bias in the selection of samples for the training set from the general sample population. The training set generator can do this by randomly selecting training samples from the population.

Sub models presuppose a type of bias when compared against the general set, and so it is important that sub models only be compared against those appropriate samples for which they can be representative. This is because a sub model is created against a subset of the entire population. To generate sub models, it is important to apply certain criteria as a primary filter. As long as this primary filter is applied uniformly, both for sample selection and for future classification, and samples are chosen at random from the post filter results, there is no additional bias introduced, at least within the scope of items pertaining to the sub model.

As the distribution of samples may not be exactly "normal", from a statistical purpose, an individual training set may not be entirely representative. To combat this, the system can attempt to increase the training set size and run multiple iterations to ensure that the variance of a particular model is not unduly biased.

The iterative models can add additional weightings to favored features based on appropriateness. By increasing the number of iterations, confidence of the validity of the weights of a feature set can be gained, resulting in a stronger overall classifier.

Models can use some subset of available features to generate classification models. Because the number of salient features can become rather large over time, and the training sets may become rather large, there may be a desire to reduce the set of features considered in an attempt to optimize the generation process. The process of pruning features can be done in an iterative manner. By reducing the set of features to those that positively affect the model, it can drastically reduce overhead in classification. Each iteration, those features that provide weak scoring (as based on a fitness function) can be dropped in subsequent iterations. This is an optional step, as full models may be more accurate than pruned/reduced models.

The set of observed features for a sample can be a subset of the overall feature space, due to either the absence of a subset of features from a sample, or the inability to observe a complete set of features. To allow for statistical comparisons between samples of various feature subsets, the system can, for instance, generate estimated features for those features not in a sample subset, define absent features as valid features for comparison, or utilize a multimodel approach to compare samples at an abstract level, where feature spaces are not directly compared.

As noted above, models can be effectively trained to use any form of supervised learning. To do this, a set of data for which you know or suspect a classification at a high confidence must be compiled. This training can be done by various methodologies. It can be hand validated, or machine generated in some contexts.

Unsupervised machine learning does not require training, but can be much more variable in its output. If the system is designed to be exploratory in nature, the training set can be judged to be the entire set.

Similarity analysis does not necessarily require training. It can take advantage of a previously classified sample to help categorize the similarities in question and judge fitness of those samples, but even this is not required. Classification offers the ability to layer context on top of similarities that may be detected, versus having to determine context from observed similarities.

Models can be validated based on a level of fitness. Fitness in this sense is the accuracy of the model, along with other facts. The system can allow for the definition of a set of criteria that defines fitness. It can be used as a low-water mark to ensure that the models produced by the system meet minimum criteria. Additional fitness criteria can be garnered by comparisons of the same data against previous models. Generally, fitness can be defined as the accuracy of classification. This accuracy can be considered by the measure and type of correct and incorrect answers. This is a more complex operation when multiple classes are considered, as the system considers these rates in a relative manner, and may choose to perform degrees of closeness to intended results in addition to the standard accuracy tests.

A sample can be classified in one of four categories (calculated per sample on a per class basis):

1. True positive—the sample belongs in the classification, and the model placed it there;
2. True Negative—the sample does not belong in the classification, and the model did not place it there;
3. False Positive—the sample does not belong in the classification, and the model placed it there;
4. False Negative—the sample belongs in the classification, and the model did not place it there.

The goal is to maximize true positives on a per class basis. The rate of error considers the tolerance for false positives and negatives. Various adjustments to the model can be used to improve or further optimize the reduction of these levels of error.

Once a model has been generated that meets the criteria for fitness, an additional back test can be calculated across the entire population. This back-test can provide a more comprehensive analysis of the samples versus the entire population. If the complete back-test demonstrates a similar fitness characteristic to the model as calculated in the training set, and the fitness meets criteria, at this point, the model can be confirmed. Once a model is confirmed, the classification for each sample in the population can be updated via the unified data access layer 135 and the new model can be put into active participation via the classifier component 125.

A general model requires calculation of several smaller specific case models. These models can defined as part of the overall model during its original genesis. The sub models operate on a very similar overall process to the main model, only on smaller data sets and sets of features. The general model can accommodate multiple sub models for particular specialized criteria. Each sub model should be generated in a similar iterative manner. The final results of the sub models should be referenced in the main model, unless a sub model is judged to be entirely complete in its assessment, in which case it supplants the main model for classifications of this type.

Multiple models can be generated as follows. For each sub model required, an appropriate entire population can be selected. Thereafter, a random training set can be selected from the sub model population. In addition, a random testing set can be selected from the sub model population. Next, a model can be generated based on the appropriate training set. The fitness of the new sub model can be iteratively tested against defined criteria and previous models. Upon achieving an accurate model, the model can be published in conjunction with the general model.

Figure 7:
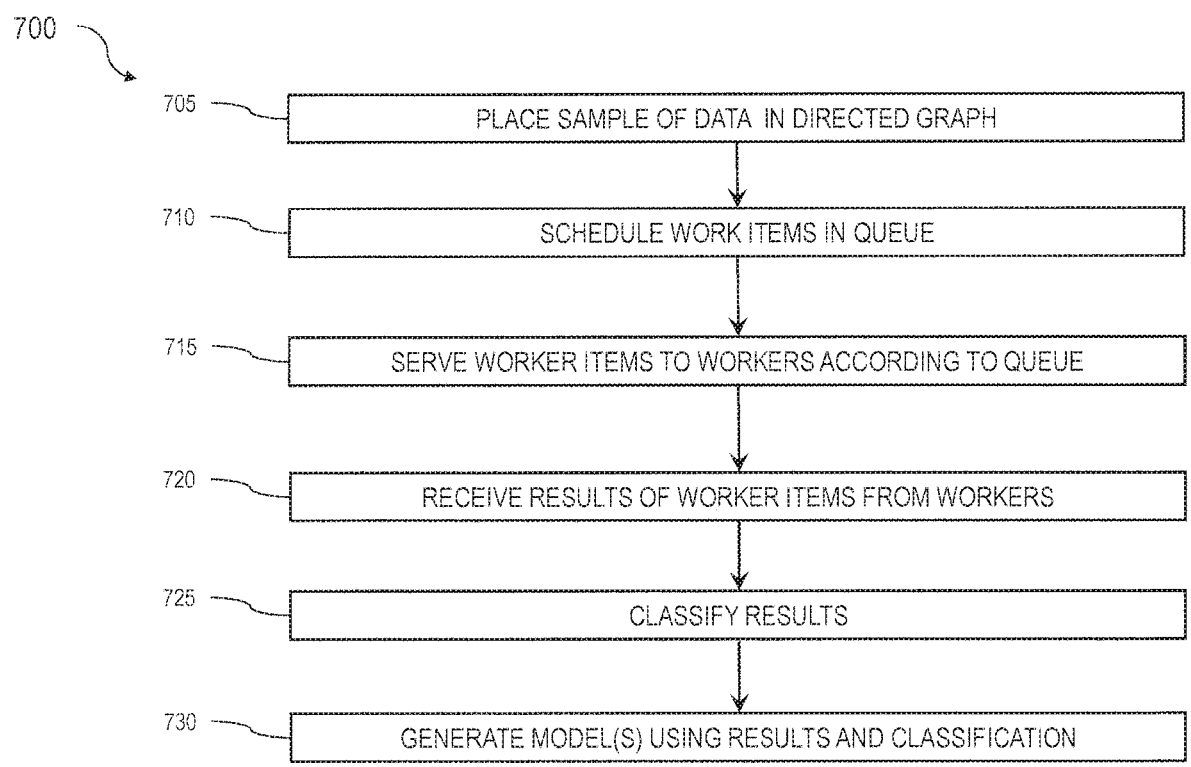
FIG. 7 is a diagram illustrating a process for generative multimodel multiclass classification and similarity analysis.

FIG. 7 is a diagram 700 of a process flow diagram in which, at 705, a sample of data is placed within a directed graph such as directed acyclic graph. The directed graph comprises a plurality of hierarchical nodes that form a queue of work items for each particular worker class that is used to process the sample of data. Subsequently, at 710, work items are scheduled within the queue for each of a plurality of workers by traversing the nodes of the directed graph. The work items are then served, at 715, to the workers according to the queue. Results can later be received, at 720, from the workers for the work items (the nodes of the directed graph are traversed based on the received results). In addition, in some variations, at 725, the results can be classified so that, at 730, one or models can be generated.

It will be appreciated that the current subject matter can be utilized across many different applications in which there is a need to classify or otherwise characterize data. In one example, this system can be used to make a determination of the likelihood that a particular computer file is malicious (intends harm to the operator or underlying computer system). In this scenario, the system can be defined by samples representing files on a computer. These files can be normal program executables, data files, or any other type of file on a computer. The classification system is tuned (using, for example, one or models that have been trained using historical file analyses with known outcomes) to model the "goodness" and "badness" of a potential sample, delivering a likelihood of a sample being something that could cause harm to a computer if executed. The models are created from a set of features extracted from samples (using, for example, one or models that have been trained using historical file analyses with known outcomes). These features can include measurement about the file as well as its contents through several stages of analysis. Some example features include file size, information density, structured layout of the file, specific elements pertinent to the type of file it is (program section names for programs, author details for documents, etc.). The features can also include several layers of deeper analysis that can be represented as features within the system. This can include deep textual or code analysis, including interpreting instructions in an emulated fashion.

Another example of the use of the current subject matter is to solve image classifications within a biomedical application, such as X-Ray processing. Sample classifications could be the likelihood of the presence of a cancerous growth within an image. In this configuration of the system, samples are represented by individual X-Ray images contained in high resolution image formatted computer files. These images are processed, collecting feature based data including orientation, size, shade differences, and linearity. These features are used to create models that offer strong ability to predict the existence or non existence of cancerous growths being detected in a particular image, and highlight those growths to a researcher or doctor.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A computer-implemented method for determining whether a computer file comprises malicious code, the method comprising:
   receiving a query at a query interface about whether a computer file comprises malicious code;
   determining, using at least one machine learning sub model, whether the computer file comprises malicious code, the sub model corresponding to a type of the computer file; and
   providing, to the query interface, data characterizing the determination,
   wherein the sub model is generated using operations comprising:
      receiving computer files at a collection interface;
      generating multiple sub populations of the computer files based on respective types of the computer files;
      generating a random training set and a random testing set from the computer files of each of the sub populations; and
      generating at least one sub model for each random training set using steps comprising:
         extracting sets of features from each of the computer files of that random training set, each set of features corresponding to the type of the computer files of that random training set, the set of features including at least one feature selected from the group consisting of file size, information density, structured layout, program section name, and author detail; and
         training the at least one sub model using the corresponding random training set; and
         validating the trained at least one sub model using the random testing set for that sub population;
   wherein the determining comprises:
      scheduling work items according to at least a sample prioritization or a worker rate;
      placing the computer file within a directed acyclic graph represented as a queue of work items for a particular worker class, wherein the directed acyclic graph comprises a plurality of hierarchical nodes in which nodes are based on the scheduling and are represented as individual worker items that are used to process the computer file;
      serving the work items to the workers according to the queue;
      receiving results from the workers for the work items; and
      classifying the computer file based on the received results to indicate whether or not the computer file likely comprises malicious code;
   wherein:
      the nodes of the directed graph are traversed based on the received results;
      each work item comprises one or more tasks to effect extraction from the computer file;
      each worker class represents a set of extracted features and is associated with a specific sample type; and
      the sample of data comprises files for access or execution by a computing system.

2. The method of claim 1, wherein the query interface comprises a representational state transfer (REST) application program interface (API).

3. The method of claim 1, wherein the query comprises metadata about the computer file.

4. The method of claim 1, wherein the query comprises an upload of the computer file.

5. The method of claim 1, wherein the multiple sub populations are generated by applying a primary filter.

6. The method of claim 1, wherein the type of at least some of the computer files is program executable.

7. The method of claim 1, wherein the type of at least some of the computer files is data file.

8. A computer system for determining whether a computer file comprises malicious code, the computer system comprising:
   at least one data processor; and
   memory storing instructions operable to cause the at least one data processor to perform functions comprising:
      receiving a query at a query interface about whether a computer file comprises malicious code;
      determining, using at least one machine learning sub model, whether the computer file comprises malicious code, the sub model corresponding to a type of the computer file; and
      providing, to the query interface, data characterizing the determination,
      wherein the sub model is generated using operations comprising:
         receiving computer files at a collection interface;
         generating multiple sub populations of the computer files based on respective types of the computer files;
         generating a random training set and a random testing set from the computer files of each of the sub populations; and
         generating at least one sub model for each random training set using steps comprising:
            extracting sets of features from each of the computer files of that random training set, each set of features corresponding to the type of the computer files of that random training set, the set of features including at least one feature selected from the group consisting of file size, information density, structured layout, program section name, and author detail; and
            training the at least one sub model using the corresponding random training set; and validating the trained at least one sub model using the random testing set for that sub population;
wherein the determining comprises:
scheduling work items according to at least a sample prioritization or a worker rate;
placing the computer file within a directed acyclic graph represented as a queue of work items for a particular worker class, wherein the directed acyclic graph comprises a plurality of hierarchical nodes in which nodes are based on the scheduling and are represented as individual worker items that are used to process the computer file;
serving the work items to the workers according to the queue;
receiving results from the workers for the work items; and
classifying the computer file based on the received results to indicate whether or not the computer file likely comprises malicious code;
wherein:
the nodes of the directed graph are traversed based on the received results;

each work item comprises one or more tasks to effect extraction from the computer file;
each worker class represents a set of extracted features and is associated with a specific sample type; and
the sample of data comprises files for access or execution by a computing system.

9. The computer system of claim 8, wherein the query interface comprises a representational state transfer (REST) application program interface (API).

10. The computer system of claim 8, wherein the query comprises metadata about the computer file.

11. The computer system of claim 8, wherein the query comprises an upload of the computer file.

12. The computer system of claim 8, wherein the multiple sub populations are generated by applying a primary filter.

13. The computer system of claim 8, wherein the type of at least some of the computer files is program executable.

14. The computer system of claim 8, wherein the type of at least some of the computer files is data file.

\* \* \* \* \*